US008244465B2

United States Patent
Arita (10) Patent No.: US 8,244,465 B2
(45) Date of Patent: Aug. 14, 2012

(54) NAVIGATION SYSTEM AND DISPLAY METHOD OF ROAD NETWORK ON THE SAME SYSTEM

(75) Inventor: Hidekazu Arita, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 481 days.

(21) Appl. No.: 12/523,980

(22) PCT Filed: Dec. 26, 2007

(86) PCT No.: PCT/JP2007/074986
§ 371 (c)(1),
(2), (4) Date: Jul. 21, 2009

(87) PCT Pub. No.: WO2008/129744
PCT Pub. Date: Oct. 30, 2008

(65) Prior Publication Data
US 2010/0082233 A1    Apr. 1, 2010

(30) Foreign Application Priority Data
Apr. 9, 2007    (JP) .................................. 2007-101894

(51) Int. Cl.
*G01C 21/00*    (2006.01)
(52) U.S. Cl. ......... 701/417; 701/429; 701/442; 701/455
(58) Field of Classification Search .................. 701/417, 701/429, 442, 455
See application file for complete search history.

(56) References Cited

U.S. PATENT DOCUMENTS

| | | | |
|---|---|---|---|
| 5,121,326 A | 6/1992 | Moroto et al. | |
| 5,315,298 A | 5/1994 | Morita | |
| 6,049,755 A * | 4/2000 | Lou et al. | 701/207 |
| 6,061,003 A * | 5/2000 | Harada | 340/995.15 |
| 6,067,502 A * | 5/2000 | Hayashida et al. | 701/209 |
| 6,178,380 B1 * | 1/2001 | Millington | 701/212 |
| 6,427,118 B1 | 7/2002 | Suzuki | |
| 6,587,787 B1 | 7/2003 | Yokota | |
| 7,206,696 B2 * | 4/2007 | Furukawa | 701/210 |
| 2006/0074553 A1 * | 4/2006 | Foo et al. | 701/212 |

FOREIGN PATENT DOCUMENTS

| | | |
|---|---|---|
| JP | 1-173817 A | 7/1989 |
| JP | 3-65612 A | 3/1991 |
| JP | 05-119701 A | 5/1993 |
| JP | 06-242722 A | 9/1994 |
| JP | 09-044085 A | 2/1997 |
| JP | 2001-116565 A | 4/2001 |
| JP | 2005-37128 A | 2/2005 |
| JP | 2006-276172 A | 10/2006 |

* cited by examiner

*Primary Examiner* — Mark Hellner
(74) *Attorney, Agent, or Firm* — Birch, Stewart, Kolasch & Birch, LLP (57) ABSTRACT

A control section 1, according to a map scale designated by a user via an input section 2, draws on its internal drawing memory, roads including its own-vehicle position obtained by a position information acquiring section 4 and display elements including city centers (display elements representing a city and indicating the representative position of the city each) or facilities. If the own-vehicle position and the display elements including the city centers or facilities are displayed in isolation on the display section 7, the control section calculates the route from the own-vehicle position to the display elements under the condition recommended by the navigation or under the condition the user designates, and draws the route produced as a result of the route calculation on the drawing memory.

6 Claims, 8 Drawing Sheets

Relationships Between Map And Map Scale

| Road Attributes \ Map Scale | 50m | 100m | 250m | 500m | 1km | 2.5km | 5km | 10km | 25km | 100km |
|---|---|---|---|---|---|---|---|---|---|---|
| Road Class 1 | X | X | X | X | X | X | X | X | X | X |
| Road Class 2 | X | X | X | X | X | X | X | X | X | X |
| Road Class 3 | X | X | X | X | X | X | X | | | |
| Road Class 4 | X | X | X | | | | | | | |
| Road Class 5 | X | X | | | | | | | | |
| District/National Highway Name | | | | | | | | | X | X |
| Position Information Icon | X | X | X | X | | | | | | |
| Facility Position Icon | X | X | X | X | | | | | | |
| Main City Icon : <20 k People | X | X | X | X | X | | | | | |
| Main City Icon : ≧20 k People | | | | X | X | | | | | |
| Main City Icon : ≧100 k People | | | | X | X | | | | | |
| Main City Icon : ≧500 k People | | | | X | X | X | | | | |
| Main City Icon : ≧ One Hundred Million People | | | | X | X | X | X | X | X | |

NAVIGATION SYSTEM AND DISPLAY METHOD OF ROAD NETWORK ON THE SAME SYSTEM

TECHNICAL FIELD

The present invention relates to a navigation system and a display method of a road network on the same system.

BACKGROUND ART

On a navigation system, contents of roads and display elements such as facilities to be displayed on a map are decided for each map scale (scale of a map). As for roads, for example, a large-scale wide-area map displays main roads such as expressways and national highways, and as the map scale reduces, more narrow roads come to be displayed. Accordingly, when the map scale is switched, the display elements being displayed can sometimes disappear from the screen suddenly, thereby confusing a user.

On the other hand, a technique is known which displays, without losing the continuity of roads, a map in a wide area in all directions placing a current position at the center. According to the technique, the map is displayed in such a manner that as the distance from the current position assigned as the origin increases, the scale is increased continuously in circumference directions (see Patent Document 1, for example).
Patent Document 1: Japanese Patent Laid-Open No. 9-44085/1997.

However, according to the technique disclosed in the foregoing Patent Document 1, since the display elements are displayed without losing continuity in the same manner as a fisheye lens, the display elements with different scales are mixedly displayed on a single screen, which presents a problem of distorting the image.

In addition, it is necessary to calculate the display positions of all the display elements like roads using a converting expression with high computation cost, which presents a problem of making it difficult for limited hardware resources the built-in equipment such as a car navigation system has to perform smooth scrolling.

The present invention is implemented to solve the foregoing problems. Therefore it is an object of the present invention to provide a navigation system and a display method of a road network on the same system aiming at achieving display without losing continuity of display elements such as roads and facilities without distortion, and at reducing a load of the hardware resources at the time of calculating the display positions.

DISCLOSURE OF THE INVENTION

To solve the foregoing problems, a navigation system in accordance with the present invention includes: a map data storage section for storing map data together with attributes and classes of the map data, the map data being composed of roads necessary for a route search and display elements including city centers (display elements representing cities and indicating representative positions of the cities) and facilities; a display section for displaying the map data; an input section for inputting an instruction from a user; and a control section for carrying out, in accordance with a map scale instructed via the input section, map display on the display section by selecting the roads based on the attributes and by selecting the display elements based on ranks, and for displaying on the display section a road without an attribute that will allow display on the map scale if the display elements or own-vehicle position is isolated, or a road is displayed with a break.

To solve the foregoing problems, a display method of a road network in a navigation system in accordance with the present invention includes: a first step of drawing, according to a map scale designated by the user via the input section, roads including an own-vehicle position obtained by the position information acquiring section and the display elements including the city centers or facilities on a drawing memory a control section has; a second step of displaying the roads and the display elements drawn on the drawing memory on a display section; a third step of calculating, if the own-vehicle position and the display elements including the city centers or facilities are displayed in isolation on the display section, routes from the own-vehicle position to the display elements under a condition recommended by navigation or under a condition which is designated by the user and is acquired via the input section; a fourth step of drawing the routes produced as a result of the route calculation on the drawing memory; and a fifth step of displaying the road network drawn on the drawing memory on the display section.

According to the present invention, the navigation system and the display method of the road network on the same system can be provided which can achieve the display without losing continuity of the display elements such as roads and facilities without distortion, and can reduce the load of the hardware resources in calculating the display positions at that time.

BEST MODE FOR CARRYING OUT THE INVENTION

The best mode for carrying out the invention will now be described with reference to the accompanying drawings to explain the present invention in more detail.

Embodiment 1

The following is the description of a configuration and operation of the navigation system of an embodiment 1 in accordance with the present invention. Before that, referring to FIG. 6-FIG. 8, an example of map display in a conventional example and an example of map display of the navigation system of the embodiment 1 in accordance with the present invention will be described in comparison.

Figure 6:
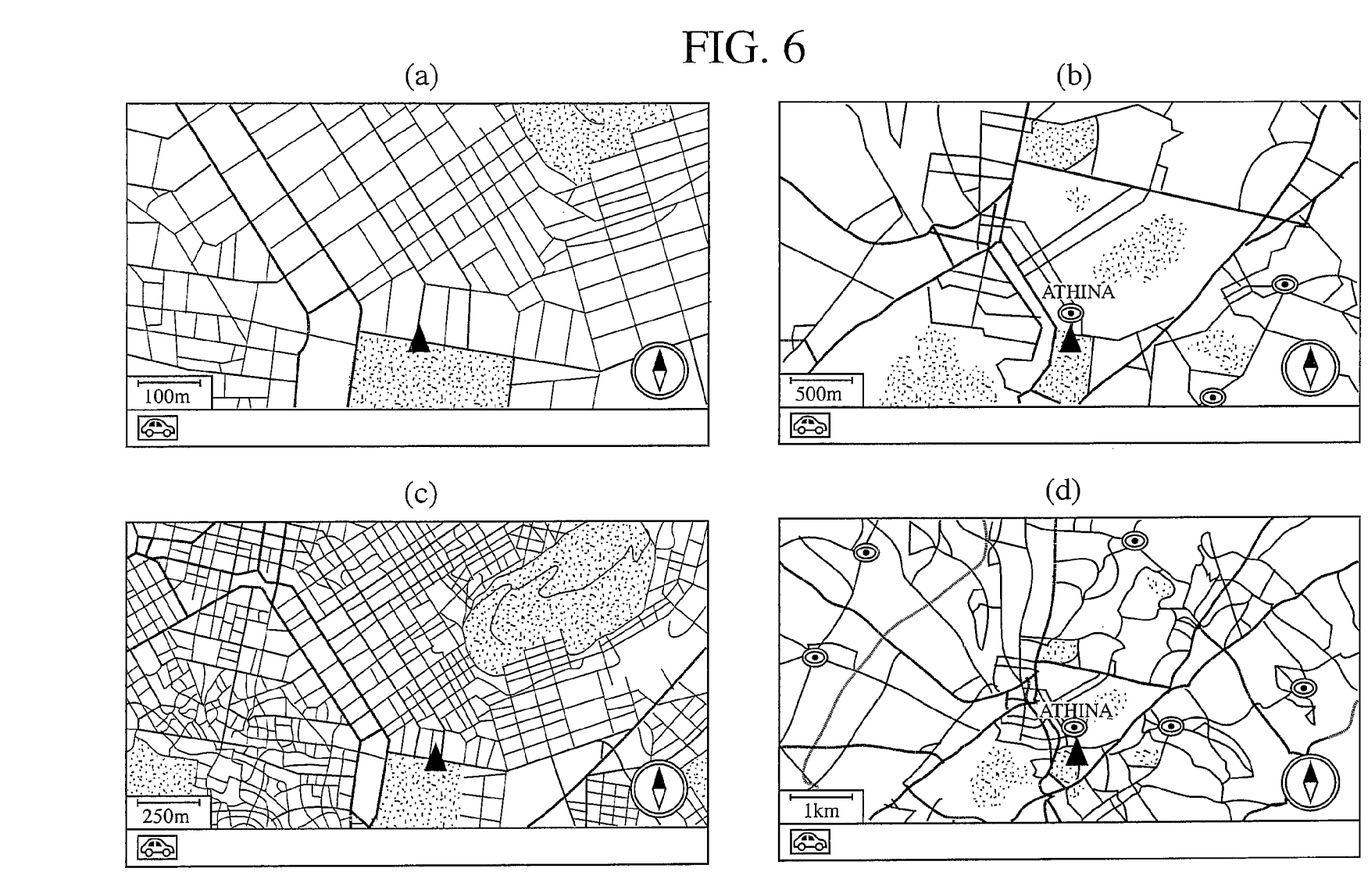
FIG. 6 is a diagram showing an example of a screen display for each map scale on a conventional navigation system.
Figure 7:
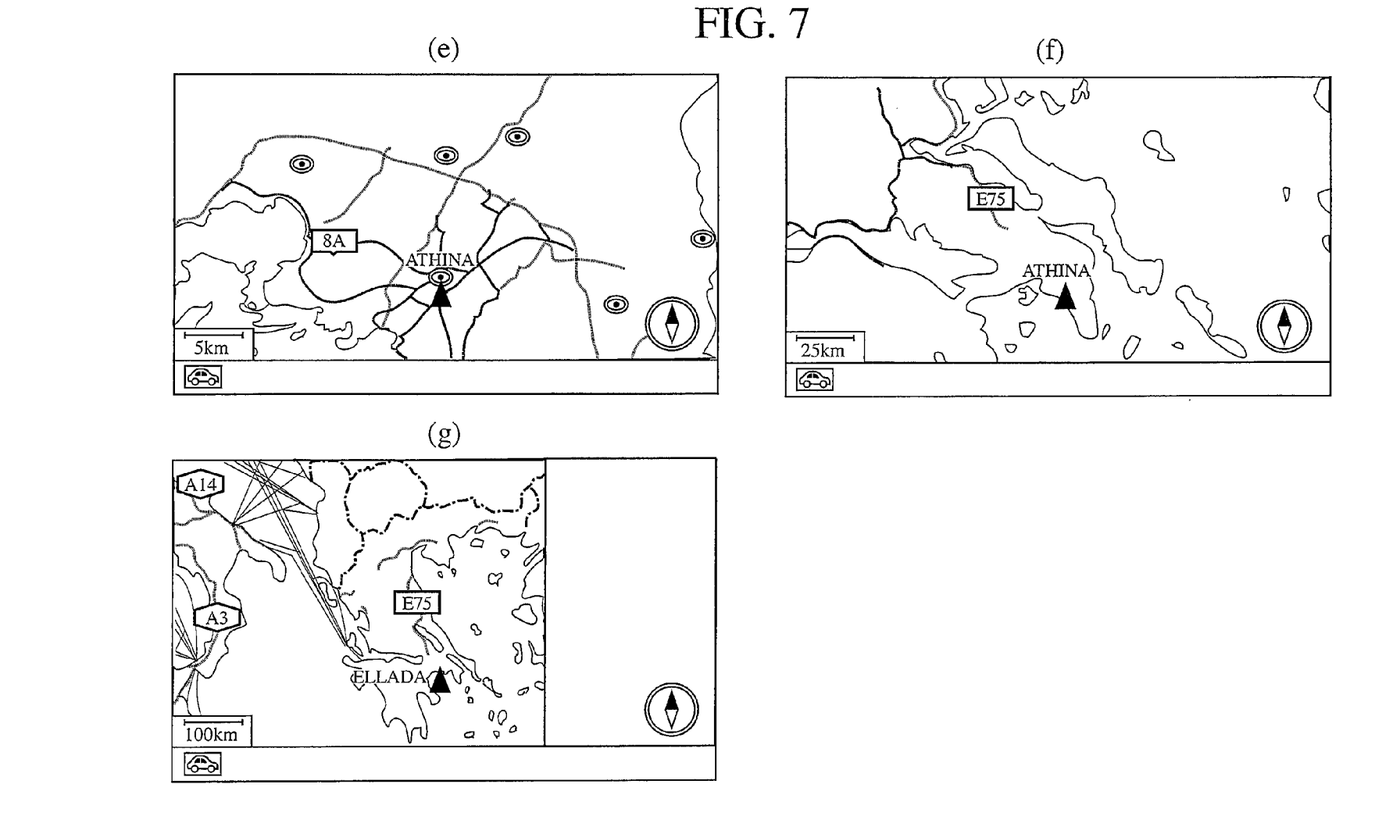
FIG. 7 is a diagram showing an example of a screen display for each map scale on a conventional navigation system.

Map display examples shown in FIG. 6-FIG. 7 are each an example which selects roads to be displayed in accordance with the road attributes and the map scale designated, selects display elements such as facilities in accordance with their ranks, and carries out map display of the display elements determined.

In FIG. 6, (a) is an example of the map display on the map scale of 100 m, (b) is that of 500 m, (c) is that of 250 m, (d) is that of 1 km, and in FIG. 7, (e) is that of 5 km, (f) is that of 25 km, and (g) is that of 100 km.

As is clear from FIG. 6, although the road network is displayed appropriately up to the map scale of 1 km of FIG. 6(d), the road network has a break on the display on the map scale of 5 km of FIG. 7(e) and on. This is because a decision is made as to whether to display a road on that map scale according to the attributes of the road di splayed in accordance with the map scale. For example, it is defined that although a road which is an expressway and has two or more lanes is displayed on a particular map scale, only a road with four or more lanes is displayed on a wider area map scale.

In contrast with this, the navigation system of the embodiment 1 in accordance with the present invention displays, concerning routes between the own-vehicle position and the city centers or main facilities like an airport displayed on a wide-area scale, roads having attributes not to be displayed on the map scale, thereby trying to display on the wide-area map scale the road network which is the required minimum for the navigation. In the case of the wider-area map scale where neither the city centers or facilities are displayed, as for the routes between the own-vehicle position and endpoints of roads (endpoints when the road display is broken), it is assumed that roads without the attributes to be displayed on the map scale are displayed.

Figure 8:
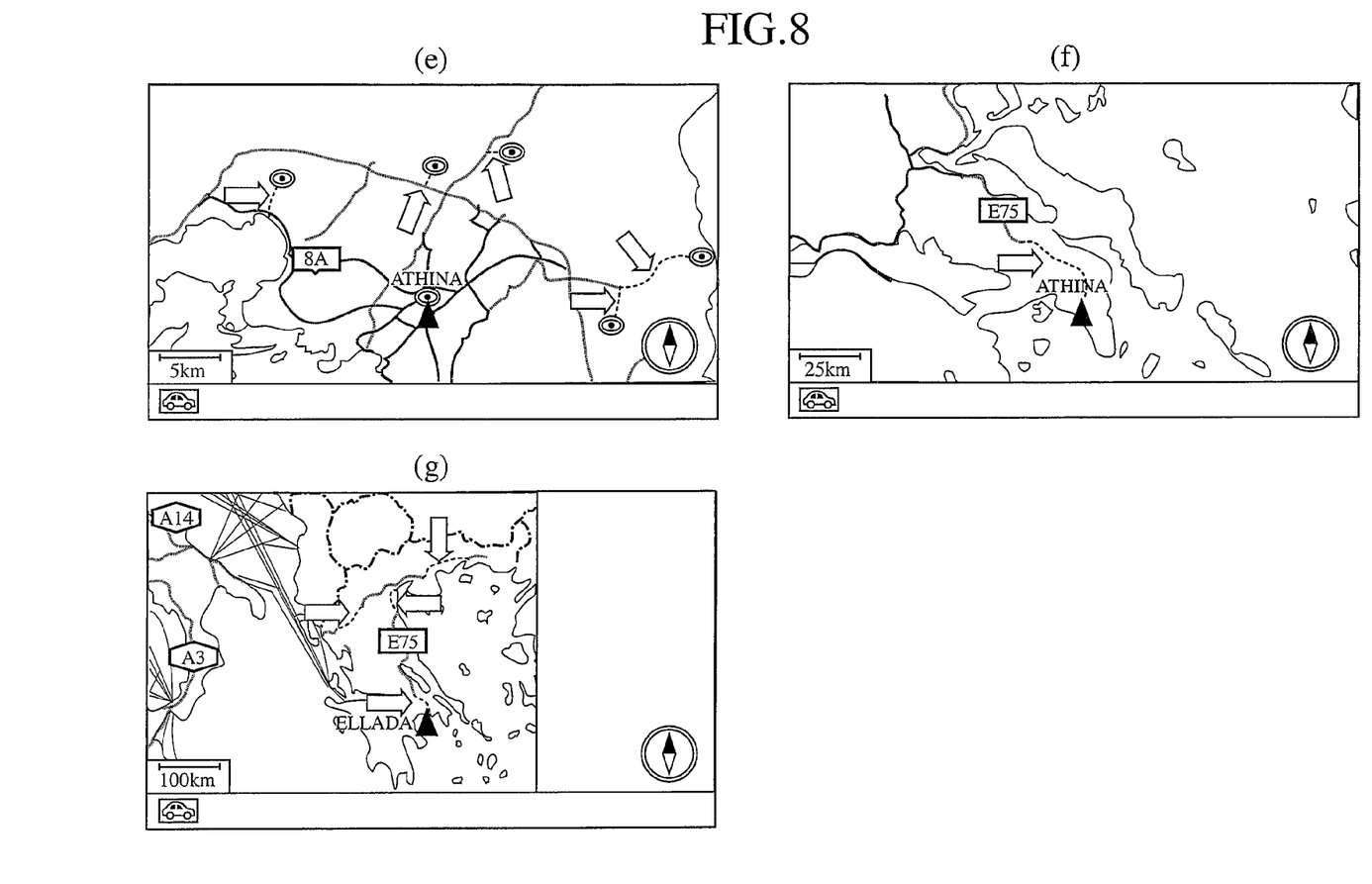
FIG. 8 is a diagram showing an example of a screen display for each map scale on the navigation system of the embodiment 1 in accordance with the present invention.

FIG. 8 shows concrete display examples. More specifically, the road networks shown in FIGS. 7(e), 7(f) and 7(g) become displays of continuous road networks as shown in FIGS. 8(e), 8(f) and 8(g). In FIG. 8, roads represented by dotted lines indicated by arrows "⇒" are displayed in addition to the conventional maps. The construction will now be described in detail below.

Figure 1:
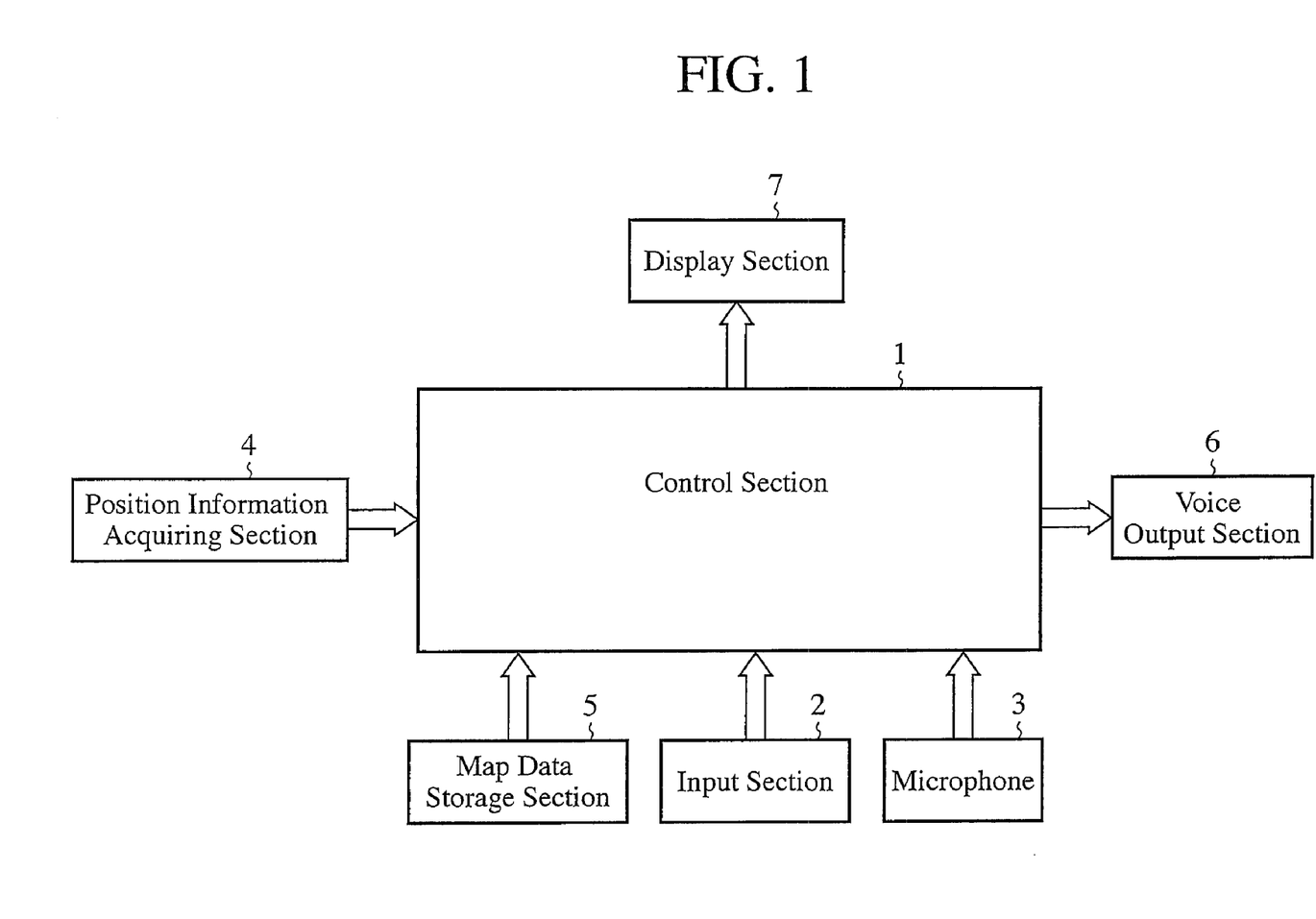
FIG. 1 is a block diagram showing an internal configuration of a navigation system of an embodiment 1 in accordance with the present invention

FIG. 1 is a block diagram showing a basic configuration of the navigation system of the embodiment 1 in accordance with the present invention. As shown in FIG. 1, the navigation system of the embodiment 1 in accordance with the present invention comprises a control section 1, an input section 2, a microphone 3, a position information acquiring section 4, a map data storage section 5, a voice output section 6, and a display section 7.

The input section 2 has a function of inputting instructions from a user, and is commonly realized by a touch panel, touch pad, remote control, commander or the like. In addition, the microphone 3 supplies the voice of a user it picks up to the control section 1.

The position information acquiring section 4 detects the position and behavior of the vehicle with a GPS (Global Positioning System) and gyro, and supplies to the control section 1. The current position information on the vehicle is used when mapping the own-vehicle position on the map data stored in the map data storage section 5 which will be described later.

Figure 2:
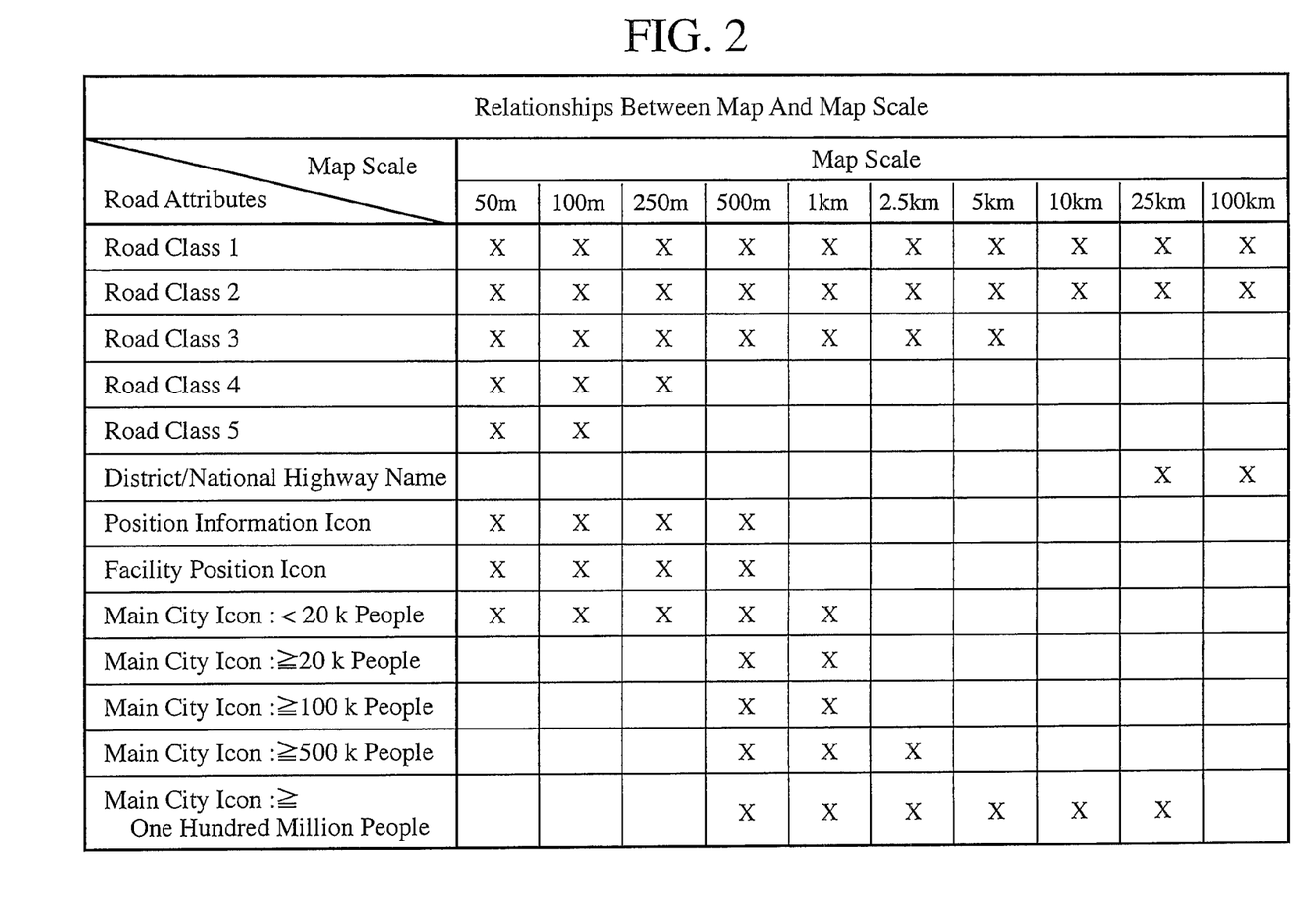
FIG. 2 is a diagram showing in a table fashion an example of a data structure to be stored in the map data storage section shown in FIG. 1.

On the other hand, the map data storage section 5 stores the map data consisting of roads necessary for the navigation and display elements including city centers and facilities, together with the road attributes and classes. FIG. 2 shows an example of the road attributes and classes to be stored in the map data storage section 5 in a table fashion.

The table shown here is used for deciding whether to display on a particular map scale in accordance with the road attributes and scales of cities. In FIG. 2, blocks including "X" mean that display will be performed on the map scales indicated by the blocks. For example, a road of the road class 1 is an expressway that is displayed on all the map displays from 50 m scale to 100 km scale. As for a road of the road class 4, which is a local road, it means that although it is displayed on the 50 m scale to 250 m scale, it is not displayed on a wider-area map from the 500 m scale and on. Likewise, as for icons of city centers, it means that although a small city with a population less than 20,000 is displayed from the 50 m scale to 1 km scale, it is not displayed in a wider-area map from the 2.5 km scale and on.

Returning to FIG. 1, the voice output section 6 produces guide information speech of the navigation, repetition of voice recognition results, and voice output of state information on the navigation such as its state and the end of operation, and of events and the like. The display section 7, which is realized from a liquid crystal display or the like, displays information such as map display and menu display in the navigation system.

The control section 1 controls the whole navigation functions the navigation system possesses originally. Normally, it is composed of a microcomputer and a memory, and the microcomputer carries out the foregoing functions by reading and executing programs recorded in the memory. Here, according to the map scale designated via the input section 2, the control section 1 selects roads based on their attributes and display elements based on their ranks, and carries out map display on the display section 7. Furthermore, when a display element or the own-vehicle position is isolated, or a road is displayed with a break, the control section 1 has a function of displaying on the display section 7 a road without having the attribute to be displayed according to the map scale. Its details will be described later.

Figure 3:
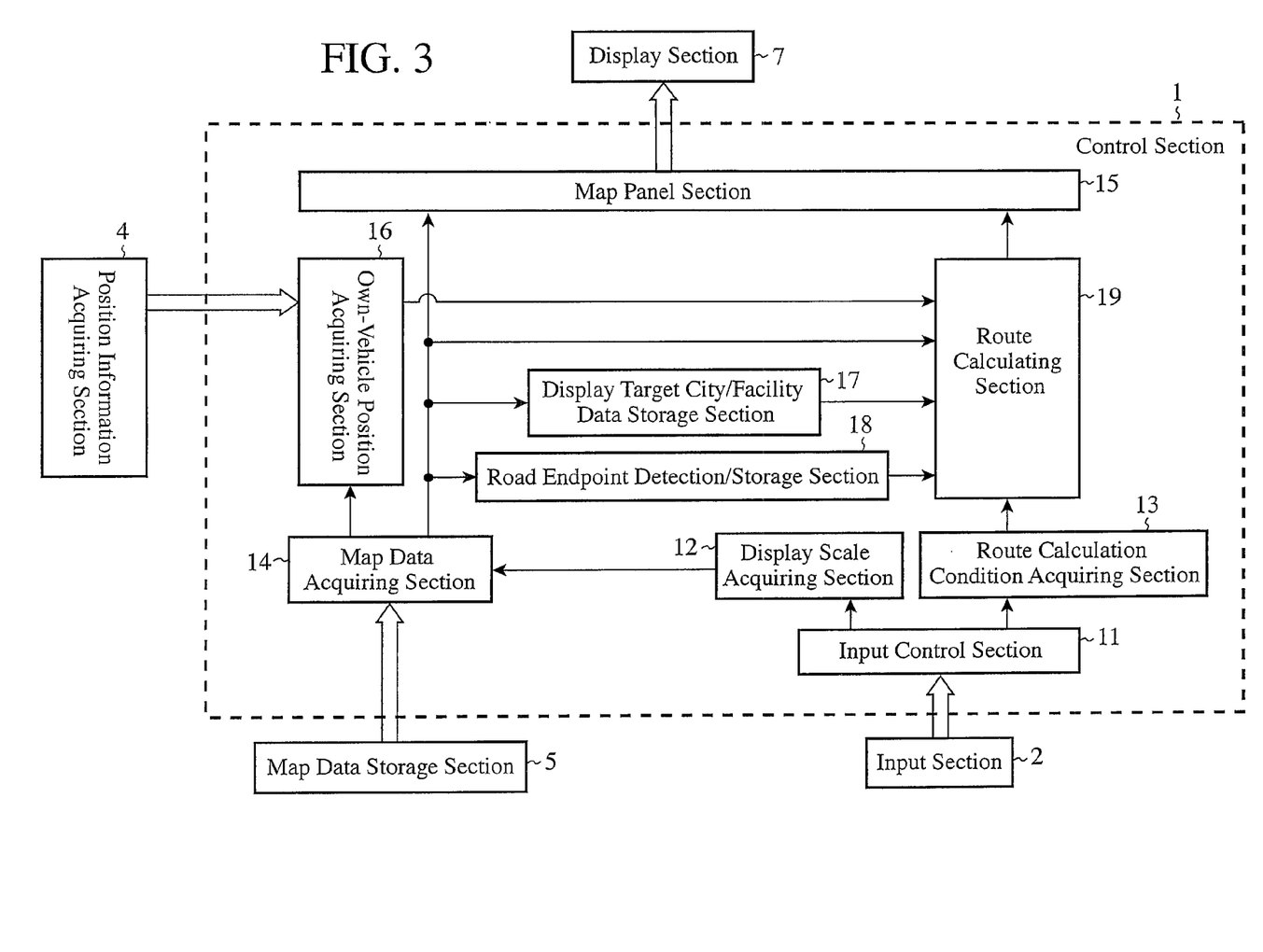
FIG. 3 is a block diagram showing an internal configuration of the control section shown in FIG. 1 by developing in accordance with functions.

FIG. 3 is a block diagram showing an internal configuration of the control section 1 shown in FIG. 1 by developing in accordance with functions. In FIG. 3, blocks designated by the same reference numerals as the blocks shown in FIG. 1 are assumed to have the same names and functions as the blocks shown in FIG. 1.

As shown in FIG. 3, the control section 1 comprises an input control section 11, a display scale acquiring section 12, a route calculation condition acquiring section 13, a map data acquiring section 14, a map panel section 15, an own-vehicle position acquiring section 16, display target city/facility data storage section 17, a road endpoint detection/storage section 18, and a route calculating section 19.

The input control section 11 has functions of obtaining a map scale and route calculation condition by acquiring user instruction input from the input section 2 via a menu or the like. The display scale acquiring section 12 obtains the map scale the user desires through the input control section 11, and controls the map data acquiring section 14. In addition, the route calculation condition acquiring section 13 obtains the route calculation condition the user desires through the input control section 11, and supplies to the route calculating section 19.

Here, the term "route calculation condition" refers to a distance priority route that will minimize the distance traveled, a time priority route that will minimize the time required or the like. Before the user designates the route calculation condition, the route recommended by the navigation system is set as an initial value. The map data acquiring section 14 obtains the map data on the scale designated by the display scale acquiring section 12 from the map data storage section 5, and supplies to the map panel section 15, own-vehicle position acquiring section 16 and the like.

The map panel section 15 is a drawing memory on which data about roads, city centers, facilities and the like to be displayed are drawn. The data drawn on the map panel section 15 is read and displayed in synchronization with display timing of the display section 7.

The own-vehicle position acquiring section 16 has a function of mapping the own-vehicle position information on the map data by map matching or the like in accordance with the position data on the vehicle obtained by the position information acquiring section 4 and the map data obtained by the map data acquiring section 14. Thus, the own-vehicle position information obtained here is supplied to the map panel section 15, and the own-vehicle position is displayed in such a manner that a vehicle icon is superimposed on the map data.

The display target city/facility data storage section 17 has a function of storing, from the map data obtained by the map data acquiring section 14, the position information about the city centers and facilities to be displayed on the map scale set by the display scale acquiring section 12. The road endpoint detection/storage section 18 has a function of detecting and storing, from the map data obtained by the map data acquiring section 14, positions of the endpoints of the roads in the road network to be displayed on the map scale set by the display scale acquiring section 12.

The route calculating section 19 has a function of calculating routes between the own-vehicle position the own-vehicle position acquiring section 16 obtains and the positions of the city centers and facilities stored in the display target city/facility data storage section 17 under the route calculation condition designated by the route calculation condition acquiring section 13, and a function of drawing the result on the map panel section 15 as the display road data. In addition, the route calculating section 19 has a function of calculating routes between the own-vehicle position and the road endpoints stored in the road endpoint detection/storage section 18, and a function of drawing the result on the map panel section 15 as the display road data.

Figure 4:
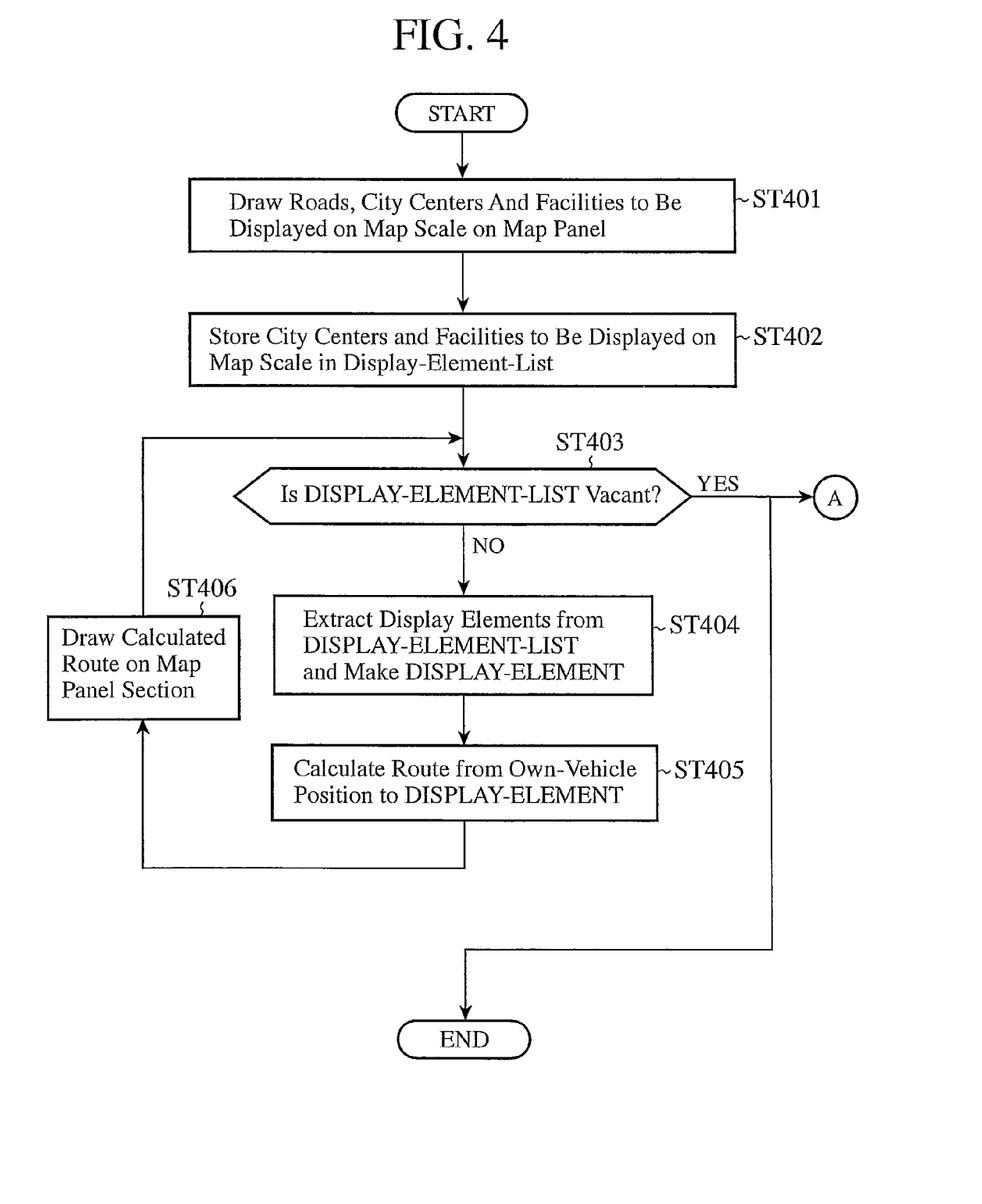
FIG. 4 is a flowchart showing the operation of the navigation system of the embodiment 1 in accordance with the present invention.

FIG. 4 is a flowchart showing the operation of the navigation system of the embodiment 1 in accordance with the present invention. Here, a display procedure of the road network is shown when the own-vehicle position and the display elements such as the city centers or facilities are displayed in isolation as a result of carrying out map display in accordance with the map scale designated by the user.

Referring to the flowchart of FIG. 4, the operation of the navigation system of the embodiment 1 in accordance with the present invention shown in FIG. 1-FIG. 3 will be described in detail.

In the navigation system (control section 1), first, according to the map scale the display scale acquiring section 12 obtains, that is, the map scale the user designates and inputs via the input section 2, the map data acquiring section 14 obtains information about the roads to be displayed and display elements such as city centers and facilities from the map data storage section 5, and draws on the map panel section 15 (step ST401).

Subsequently, the control section 1 stores the city centers and facilities to be displayed on the foregoing map scale in the display target city/facility data storage section 17 (here, in the DISPLAY-ELEMENT-LIST) (step ST402). Subsequently, the control section 1 refers to the display target city/facility data storage section 17 to make a decision as to whether it is vacant or not (step ST403). If a decision is made that it is vacant ("YES" at step ST403) the control section 1 closes the processing. Unless a decision is made that it is vacant ("NO" at step ST403), it extracts the display elements from the display target city/facility data storage section 17 and makes it DISPLAY-ELEMENT (step ST404).

Next, the control section 1 calculates routes from the own-vehicle position to the display elements with the route calculating section 19 (step ST405). As for the route calculation the route calculating section 19 executes, it performs the route calculating processing the navigation system has as standard using the route calculation condition obtained by the route calculation condition acquiring section 13. Normally, they can be calculated by the Dijkstra method, which is an algorithm in the shortest route problem, or a like method.

The Dijkstra method is a method of obtaining the shortest route and shortest distance from a particular point. Assume on a network having n nodes (set N) that the shortest distance from a starting point s to a point j is $v_j$, which is given in terms of the distances $d_{ij}$ of branches (i, j), and that a point immediately previous to the route is $p_j$. Then, extending the branches from the starting point s to the point j in ascending order of $v_j$ makes it possible to find the shortest distance on the network.

Subsequently, the control section 1 draws the route (roads) the route calculating section 19 calculates on the map panel section 15 (step ST406), and returns to the processing at step ST403.

Incidentally, when drawing the route (roads) on the map panel section 15, although the portions of the roads to be displayed on the map scale designated before are displayed according to the display attributes such as colors and thicknesses defined on the map scale, the route without having the attributes to be displayed on the map scale can be displayed in a distinct manner such as using dotted lines so as to indicate that these roads have lower ranks.

As described above, selecting the road network capable of preventing the own-vehicle position and the city centers or facilities from being isolated, the control section 1 can carry out the route calculation between the own-vehicle position and the city center in accordance with the condition recommended by the navigation or with the condition the user designates, and can select and display the roads produced as a result of the calculation. Thus, the user can find the geometry of the roads from the own-vehicle position to the city center or facilities (such as an airport) displayed. Here, according to the geometry of the roads, the user can find whether the road is a coastal road or a mountainous road. In addition, since the own-vehicle position varies in accordance with the movement of the vehicle, although it is impossible to prepare a map for display in advance, it is possible to display the map as occasion demands because it is dynamically calculated here.

Incidentally, when selecting, on the map for display, the roads which enable all the city centers or facilities to be displayed without being isolated on the map scale in advance, the control section 1 can reduce the amount of calculation by only obtaining and displaying a path from the own-vehicle position to the nearest road, thereby being able to reduce the load of the control section 1. In this case, however, the roads can sometimes include a road with a condition other than the user designates.

Figure 5:
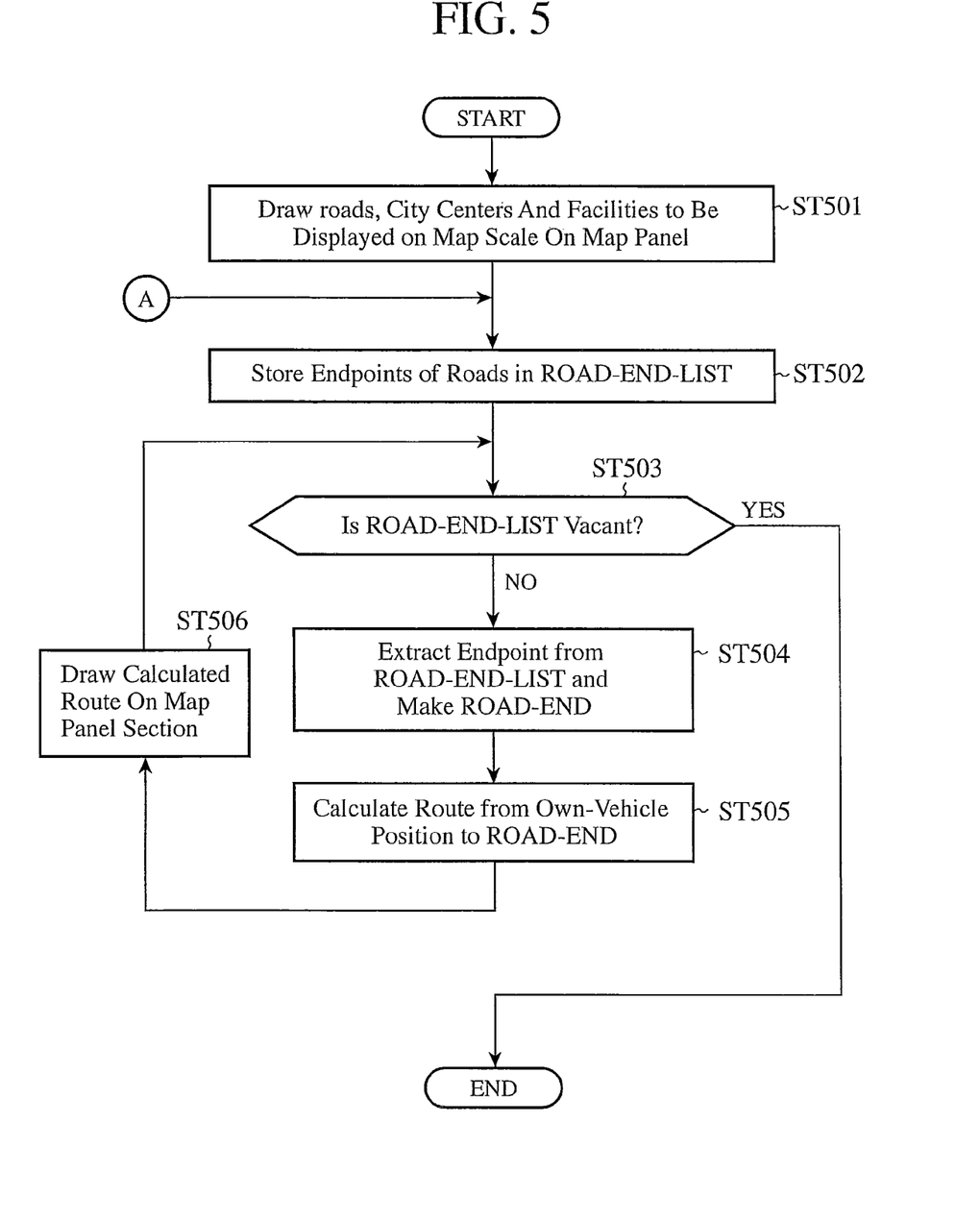
FIG. 5 is a flowchart showing the operation of the navigation system of the embodiment 1 in accordance with the present invention.

FIG. 5 is a flowchart showing the operation of the navigation system of the embodiment 1 in accordance with the present invention. Here, a display procedure of the road network is shown when the roads connecting the own-vehicle position and the city centers or facilities are displayed with a break as a result of carrying out map display in accordance with the map scale designated.

Referring to the flowchart of FIG. 5, the operation of the navigation system of the embodiment 1 in accordance with the present invention shown in FIG. 1-FIG. 3 will be described in detail.

In the navigation system (control section 1), first, according to the map scale the display scale acquiring section 12 obtains, that is, the map scale the user designates and inputs via the input section 2, the map data acquiring section 14 obtains information about the roads to be displayed and the display elements such as city centers and facilities from the map data storage section 5, and draws on the map panel section 15 (step ST501).

Subsequently, the control section 1 obtains endpoints of the roads, and stores in the road endpoint detection/storage section 18 (ROAD-END-LIST) (step ST502). The endpoint of the road can be obtained by selecting from the nodes of the segments displayed a node having only one link connected to the node. Subsequently, the control section 1 refers to the road endpoint detection/storage section 18 to make a decision as to whether it is vacant or not (step ST503). If a decision is made that it is vacant ("YES" at step ST503) the control section closes the processing. Unless a decision is made that it is vacant ("NO" at step ST503), it extracts an endpoint from the road endpoint detection/storage section 18 and makes it ROAD-END (step ST504).

Next, the control section 1 calculates a route from the own-vehicle position to the ROAD-END with the route calculating section 19 (step ST505). As for the route calculation the route calculating section 19 executes, it performs the route calculating processing the navigation system has as standard using the route calculation condition obtained by the route calculation condition acquiring section 13. Normally, they can be calculated by the Dijkstra method, which is an algorithm in the shortest route problem, or a like method.

Subsequently, the control section 1 draws the route the route calculating section 19 calculates on the map panel section 15 (step ST506), and returns to the processing at step ST503.

Incidentally, when drawing the route (roads) on the map panel section 15, although the portions of the roads to be displayed on the map scale designated before are displayed according to the display attributes such as colors and thicknesses defined on the map scale, the route without having the attributes to be displayed on the map scale can be displayed in a distinct manner such as using dotted lines so as to indicate that these roads have lower ranks.

Incidentally, in the foregoing embodiment 1, although the description is made separately about the case where the own-vehicle position or the city centers or facilities that will become a destination are displayed in isolation and about the case where the roads are displayed with a break, branching from (A) of the flowchart of FIG. 4 to (A) of the flowchart of FIG. 5 makes it possible to handle both the cases where the own-vehicle position or the city centers or facilities are displayed in isolation and where the roads are displayed with a break.

As described above, in the case where a road is displayed with a break when displaying only the roads with the attributes that will allow the roads to be displayed on the map scale, it becomes possible to prevent such a road network as including a road with an artificial break from being displayed by calculating the route between the endpoint and the own-vehicle position under the condition recommended by the navigation or under the condition the user designates, and by selecting the route (road) obtained as a result of the route calculation and displaying it. This can prevent the user from misunderstanding that the vehicle cannot pass through although it can pass in practice.

In addition, according to the foregoing embodiment 1, even on a display on a wider-area scale, the roads from the own-vehicle position to cities (city centers) or facilities such as an airport with the rank to be displayed on the scale can be displayed on a map without distortion. Furthermore, since the roads to be displayed are displayed exactly at the positions of the map data stored in the map data storage section 5 in advance, the display position calculation can be achieved at nearly the same cost as the map drawing in the normal navigation system.

As described above, according to the scale of the map display, the navigation system of the embodiment 1 in accordance with the present invention can display the road network in such a manner as to prevent the own-vehicle position and the display elements such as city centers and facilities from being isolated by determining the roads to be displayed according to their attributes, by determining the city centers and facilities to be displayed according to their ranks, and by displaying a road with a lower rank if the own-vehicle position or the city center or facility as a destination is isolated or if the road network is displayed with a break when the map display is carried out based on the display elements determined.

Conventionally, if the road between the own-vehicle position and the city (city center) or facility such as an airport is displayed with a break, the user cannot decide as to whether the road between the break and the destination is connected via a detour or nearly a straight line, thereby providing the user with a feeling of uneasiness. However, since the road with the lower rank is displayed here, the unrest can be dispelled. In addition, since the route display is achieved without losing continuity of the roads, it becomes unnecessary to calculate the display positions of all the display elements by the converting expression with high calculation cost, thereby enabling the hardware resources mounted on a built-in device such as a car navigation system to carry out smooth scrolling.

Incidentally, a display method of a road network in the navigation system of the embodiment 1 in accordance with the present invention is a display method of a road network in the navigation system, which comprises in FIG. 1, for example, the map data storage section 5 for storing map data consisting of roads necessary for the navigation and the display elements including the city centers and facilities together with the attributes and classes, the position information acquiring section 4 for obtaining the position information about the vehicle, the control section 1 including the drawing memory (map panel section 15), the input section 2 and the display section 7; and which comprises in the flowchart of FIG. 4, for example, a first step (ST401) of drawing on the drawing memory 15 the roads including the own-vehicle position obtained by the position information acquiring section 4 and the display elements including the city centers or facilities according to the map scale designated by the user via the input section 2, a second step (ST402) of displaying on the display section 7 the roads and display elements drawn in the drawing memory 15, a third step (ST404 and ST405) of calculating, when the own-vehicle position and the display elements such as the city centers or facilities are displayed in isolation on the display section 7, the routes from the own-vehicle position to the display elements under the condition recommended by the navigation or under the user designation condition acquired via the input section 2, a fourth step (ST406) of drawing the routes produced as a result of the route calculation on the memory, and a fifth step (ST404) of displaying the road network drawn on the drawing memory 15 on the display section 7.

In addition, in the display method of the road network in the navigation system of the embodiment 1 in accordance with the present invention, the fourth step (ST406) comprises, in the flowchart of FIG. 5, for example, a sub-step (ST502) of calculating, when the roads connecting the own-vehicle position to the display elements such as the city centers or facilities are displayed with a break on the display section 7, the endpoints of the roads with the break, and a sub-step (ST504 and ST505) of calculating, concerning between the endpoints of the roads with the break and the own-vehicle position, the routes under the condition recommended by the navigation or under the user designation condition acquired via the input section 2.

According to the foregoing display method of the road network in the navigation system of the embodiment 1 in accordance with the present invention, it becomes possible to achieve display without losing continuity of the display elements such as roads without distortion, and to reduce the load of the hardware resources in calculating the display positions at that time.

Incidentally, as for the functions of the blocks the navigation system (control section 1) shown in FIG. 1 comprises, they can be implemented by software in their entirety, or by hardware at least in part. For example, as for the data processing of the route calculating section 19, it can be implemented by a plurality of programs on a computer, or by hardware at least in its part.

INDUSTRIAL APPLICABILITY

As described above, the navigation system in accordance with the present invention and the display method of the road network on the same system, which display the roads and display elements such as facilities without distortion while maintaining their continuity by displaying such roads with the attributes that will not allow the roads to be displayed on the map scale, thereby achieving a navigation system and a display method of a road network on the same system capable reducing the amount of calculation at that time. Thus, they are suitable for the application to an onboard navigation system and a display method of a road network on the same system and the like.

What is claimed is:

1. A navigation system comprising:
a map data storage section for storing map data together with attributes and classes of the map data, the map data being composed of roads necessary for a route search and display elements including city centers and facilities, and the city centers being a display element each representing a city and indicating a representative position of the city, wherein the attributes are indicative of whether or not each of the roads should be displayed for each of a plurality of map scales;
a display section for displaying the map data;
an input section for inputting an instruction from a user; and
a control section for carrying out:
a procedure of calculating a route between an own-vehicle position and a destination represented by one of the display elements, the destination being instructed via the input section,
in accordance with one of the plurality of map scales instructed via the input section, a procedure of displaying a map on the display section by:
selecting the roads indicated by the attributes as being displayable according to the instructed map scale, and by selecting the display elements based on ranks,
further selecting each of the roads that is part of the calculated route but not indicated by the attributes as being displayable according to the instructed map scale, and
displaying the selected roads and the selected display elements on the display selection as part of the map.

2. The navigation system according to claim 1, wherein the control section displays each selected road not indicated by the attributes as being displayable according to the instructed map scale on the display section in a fashion different from the other selected roads.

3. The navigation system according to claim 1, wherein the route calculation is performed between the own-vehicle position and one of the selected display elements, and the route calculation is performed under a condition recommended by navigation or under a condition which is designated by the user and is input from the input section.

4. The navigation system according to claim 1, wherein the route calculation is performed between an endpoint of one of the roads, which is indicated by the attributes as being displayable according to the instructed map scale and the own-vehicle position, the route calculation being performed under a condition recommended by navigation or under a condition which is designated by the user and is input from the input section.

5. A display method of a road network in a navigation system having a map data storage section for storing map data, which is composed of roads necessary for a route search and display elements including city centers and facilities, together with attributes and classes of the map data, the attributes being indicative of whether or not each of the roads should be displayed for each of a plurality of map scales, the navigation system also having a position information acquiring section for obtaining position information on a vehicle, a control section including a drawing memory, an input section for inputting an instruction from a user, and a display section for displaying the map data, the display method of the road network in the navigation system comprising:
calculating a route between an own-vehicle position and a destination represented by one of the display elements, the destination being instructed by the user via the input section;
drawing, according to one of a plurality of map scales designated by the user via the input section, a map on the drawing memory by:
selecting the roads indicated by the attributes as being displayable according to a designed map scale, the selected roads including an own-vehicle position obtained by the position information acquiring section,
drawing the selected roads and one or more of the display elements on the drawing memory;
further selecting each of the roads that is part of the calculated route produced as a result of the route calculation, but not indicated by the attributes as being displayable according to the designated map scale, on the drawing memory; and
displaying the road network drawn on the drawing memory on the display section.

6. The display method of the road network in the navigation system according to claim 5, wherein:

the route is calculated when a road connecting between the own-vehicle position and the display elements including the city centers would be displayable based on the attributes with a break; and the route is calculated between the endpoint of the road with the break and the own-vehicle position, under a condition recommended by navigation or a condition which is designated by the user and is acquired via the input section.

* * * * *